Figure 1:
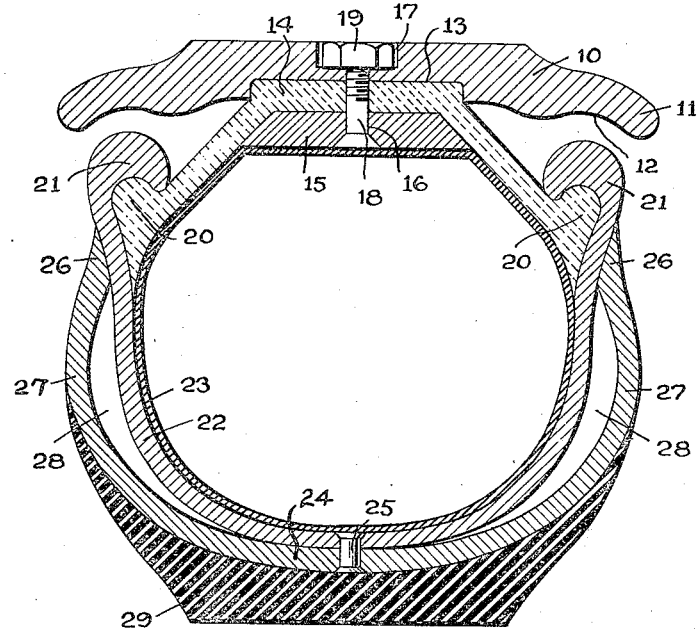

G. A. WEBER.
NONPUNCTURABLE TIRE.
APPLICATION FILED NOV. 7, 1919.

1,423,977. Patented July 25, 1922.

Inventor
George A. Weber
By his Attorneys
Emery, Varney, Blair & Hoguet

UNITED STATES PATENT OFFICE.

GEORGE A. WEBER, OF STAMFORD, CONNECTICUT.

NONPUNCTURABLE TIRE.

1,423,977.  Specification of Letters Patent.  Patented July 25, 1922.

Application filed November 7, 1919. Serial No. 336,489.

*To all whom it may concern:*

Be it known that I, GEORGE A. WEBER, a citizen of the United States, and a resident of Stamford, Connecticut, have invented an Improvement in Nonpuncturable Tires, of which the following is a specification.

This invention relates to tires and more particularly to non-puncturable tires of the armored type adapted for use on motor vehicles.

One of the objects of this invention is to provide a simple and practical non-puncturable tire having great ruggedness of design and great durability and having also a desirable high degree of resiliency.

Another object is to provide such an armored tire construction that its use and application will be accomplished with a minimum amount of manual manipulation and without detracting from the effectiveness of the operation of the resultant structure.

A further object of this invention is to provide an extremely simple means for centering the metallic casings of certain types of armored tires upon the rim, in order to simplify the construction, minimize the cost of production and insure a greater degree of effectiveness.

A further object is to provide novel means for insuring armored protection not only to the resilient medium employed in the tire, but also to the metallic casing containing the medium itself. In the use of tires either of the pneumatic or armored type, there may result considerable damage to the main casing of the tire from contacts with curbing, stones in the roadway, and the like; and it has been found that even metallic casings may be seriously damaged by reason of bruises obtained in this or other ways. Accordingly, this invention contemplates an armored protection for such armored tires, to prevent the injuries thus sustained by structures of this type.

Another object of this invention is to provide an effective means for insuring efficient and most reliable operation of armored tires under high temperature conditions resulting from continuous use of the tire, or from high temperatures resulting from seasonal or climatic conditions.

Other objects will be in part obvious and in part pointed out hereinafter.

The invention accordingly consists in the feaures of construction, combinations of elements, and arrangement of parts which will be exemplified in the structure hereinafter described, and the scope of the application of which will be indicated in the following claims.

Figure 2:
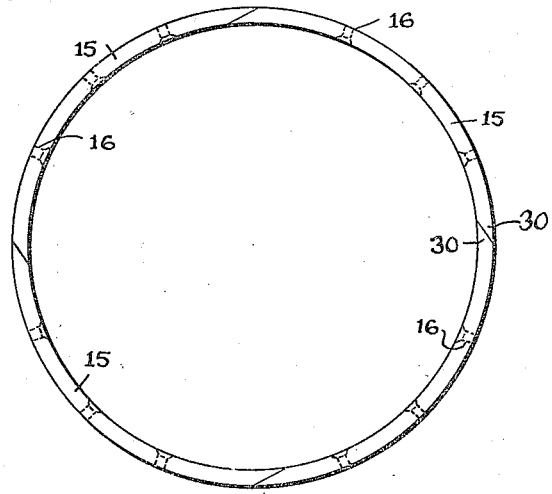

Referring to the drawings,

Fig. 1 is a cross-section of a tire forming one preferred embodiment of this invention, and Fig. 2 is a plan view of certain auxiliary parts used in connection with this improved tire construction, and is on a smaller scale.

Referring to Fig. 1 of the drawings, there is shown in cross-section, a rim 10, provided with laterally extending guard rails 11, at the exterior surfaces of which the guard rails 11 are provided with depressions or grooves 12 for a purpose to be hereinafter described. The rim 10 is preferably of such form and construction that it may be readily mounted and clamped upon an automobile wheel, thus giving it the features in common with the well-known demountable rim, and may be so constructed for this purpose, as is shown in applicant's pending application Serial Number 278,384, for "non-puncturable tires," filed February 21st, 1919.

At its central portion and extending circumferentially, the rim 10 is provided with a groove 13 of the general shape as shown in Fig. 1, adapted to receive the base portion of the centering piece 14 continuous throughout its entire circumference and likewise continuous laterally. The centering piece 14 is composed of a flexible material, such as fabric impregnated with rubber, and is composed of one piece throughout its entirety. The base portion which is received by the groove 13 of the metallic rim 10 is preferably made slightly heavier and is secured to the rim 10 by means of the clamping bands 15 shown in elevation in Fig. 2 and extending throughout the entire circumference of the centering piece 14. The clamping bands 15 have bevelled ends 30 for overlapping each other and are shown in Fig. 2 to be four in number, but this invention contemplates the use of a single band, forming in substance a split ring, and likewise extending throughout the entire circumference, and contemplates also the subdivision of the clamping band 15 into a number of parts other than the four parts shown in Fig. 2. The bands 15 may be composed of metal, but are preferably composed of a heavy fabric interwoven with metallic fibres, such as wire, to produce great rigidity.

At convenient intervals, as at 16 in Fig. 2, the clamping bands 15 are provided with countersunk holes coinciding with similar openings provided at like intervals in the centering piece 14, and also in the metallic rim 10. At the interior surface of the rim 10, these openings are counterbored, as at 17 in Fig. 1, to receive the end of the bolt 18 and the nut 19 passing through the coinciding openings in the three members and securely fastening the centering piece 14 to the rim 10. The counterbored portions 17 in the rim entirely receive the end of the bolt 18 and the nut 19 thereon, so that the interior surface of the rim is free from projections of any kind and may thus be readily adapted for demountable use. The clamping effect of the bolt 18 in clamping the centering piece 14 to the rim 10 is transmitted circumferentially by means of the clamping bands 15, so that the centering piece 14 is securely fastened to the rim, not merely in certain definite points, but substantially throughout its entire circumference.

The centering piece 14 is provided with beads 20 which are adapted to engage the inner recessed edges 21 of the metallic casing 22 and thus securely interlock the centering piece 14 with the casing 22. Such interlocking becomes absolute and positive, particularly when a pneumatic tube, indicated in section at 23, is inflated. The inturned edges 21 of the casing 22 are in substantial alignment with the grooves 12 on the rim 10; such that contact of the casing 22 with the rim 10 in consequence of a failure of the pneumatic or other resilient medium within the tire will result in the grooves 12 substantially guiding and maintaining the casing 22 in proper operative relation to the rim 10, thereby to transmit the load from the casing 22 to the rim 10 itself. The grooves 12 likewise assist in maintaining the proper alignment of the casing 22 with respect to the rim 10 during such failure.

Mounted upon the casing 22 and enveloping laterally the casing 22, there is provided a metallic armored outer casing 24, which contacts with the casing 22 substantially at its greatest diameter, at which contacting section the protective casing 24 is riveted at convenient intervals to the casing 22, as by the rivet 25. The edges 26 of the protective shell 24 are preferably welded to the casing 22, thus rigidly securing the armored casing 24 upon the casing 22. At its lateral portions, as at 27, the armored shell 24 is preferably made to bulge out laterally for a purpose to be hereinafter mentioned, and thus also forming an annular air chamber 28 at each side of the casing 22. The armored shell 24 is provided at its exterior surface with a tread 29 which is preferably vulcanized or otherwise secured thereto, and which tread may consist of rubber, fabric and rubber, or other compositions adapted to give great resistance to wear, as well as a desirable degree of resiliency. The tread 29 may extend partially around the sides of the casing 24 in order to provide ample tractive surface, both at the surface of contact with the roadbed and laterally as well.

In the use of this construction the centering piece 14 is first securely clamped by means of the clamping bands 15 and the bolts 18 to the rim 10, whereupon the metallic armored casing with a pneumatic tube inserted is applied, first to interlock one bead 20 of the centering piece 14 and then the other bead, to interlock with the corresponding recess of the metallic casing 22. Upon inflation of the pneumatic tube the several parts are securely interlocked and held in substantially the relative positions shown in Fig. 1. Resiliency is secured by means of the side sections of the centering piece 14, whereby an appreciable relative motion may take place between the metallic casing proper and the rim 10. The interior metallic casing 22 is at all times protected from bruises and other injuries sustained by contacts with stones and curbing by means of the protective casing 24, which is preferably built of greater weight and thickness than the interior casing 22. Such construction permits of the use of smaller thickness of material for the casing 22, thereby adding but inappreciably to the total weight of the resultant structure. Likewise, a double protection is obtained for the pneumatic tube or other resilient medium employed within the casing, and the non-failure of the tire is doubly insured.

It is well-known that tires attain high degrees of temperature when used at considerable speeds, or for considerable periods of time without interruption, or from exposure to atmospheric temperatures, and that the effects produced upon pneumatic tires by reason of such increased temperature are greatly undesirable in that the air pressure is materially and appreciably increased. It will be noted that the annular air chambers 28 separating the protective shell 24 from the metallic casing 22 form highly effective heat insulating mediums and thus materially prevent the transmission of heat from the outer casing 24 to the inner casing, regardless of what the source of the heat may be. Also, the metallic contact between the two metallic casings is a minimum and since the metallic casings are substantially tangent one to another at the circumferential line, as at 25, this contact as well as the transmission of heat is effectively maintained at a minimum.

It will be noted that there has been provided in this invention a non-puncturable tire of extreme simplicity and having extreme ruggedness of construction. It will be noted further that in this invention the several objects as well as many other advantages have been effectively achieved.

As various possible embodiments might be made of the above invention and as various changes might be made in the embodiment herein set forth, it is to be understood that all matter herein set forth or shown in the accompanying drawings is to be interpreted as illustrative and not in a limiting sense.

What I claim is:

1. In a device of the class described, in combination, a rim, a metallic casing, a single unitary member interlocked with said casing for centering said casing upon said rim, said metallic casing and said member forming a substantially unbroken interior chamber, and a resilient medium mounted within said chamber formed by said casing and said member.

2. In a device of the class described, in combination, a rim, a metallic casing, a single flexible member interlocked with said casing for centering said casing on said rim, said flexible member cooperating with said metallic casing to form a substantially continuous interior chamber, and a resilient medium received by said chamber formed by said casing and said flexible member.

3. In a device of the class described, in combination, a rim, a metallic casing, a single flexible member interlocked with said casing for centering said casing on said rim, said flexible member cooperating with said metallic casing to form a substantially continuous interior chamber, means for detachably securing said flexible member to said rim, and a resilient medium received by said chamber formed by said casing and said flexible member.

4. In a device of the class described, in combination, a rim provided with a groove extending circumferentially about the exterior surface thereof, a metallic casing, a single resilient centering means provided with a substantially flat portion adapted to be seated within said groove in said rim and interlocked with said metallic casing for centering said casing upon said rim, said resilient means cooperating with said metallic casing to form a substantially continuous interior chamber, means for clamping said centering means within said groove, and a resilient medium mounted within said chamber formed by said casing and said resilient means.

5. In a device of the class described, in combination, a rim, a metallic casing, a single unitary resilient means interlocked with said casing for centering said casing on said rim, said means and said casing forming a substantially continuous interior chamber, a resilient medium mounted within said chamber, and a protective shell encasing said metallic casing.

6. In a device of the class described, in combination, a rim, a metallic casing comprising two substantially superimposed metallic shells adapted to form heat insulating chambers therebetween, one of said shells having inwardly extending recessed portions and the outer shell having laterally extending portions for armoring the interior shell, a single unitary resilient means mounted upon said rim and having beaded portions for interlocking with the recessed portions of said one shell for centering said casing on said rim, said interior shell and said resilient means forming a substantially continuous interior chamber, and a resilient medium mounted within said chamber.

7. In a device of the class described, in combination, a rim, a metallic casing comprising two substantially superimposed metallic shells adapted to form heat insulating chambers therebetween, one of said shells having inwardly extending recessed portions and the outer shell having laterally extending portions for armoring the interior shell, a single unitary resilient means mounted upon said rim and having beaded portions interlocking with said recessed portions of said one shell for centering said casing on said rim, said resilient centering means being inclined laterally with respect to said rim and adapted to be placed in tension, thereby to substantially prevent relative lateral motion between said rim and said casing, and a resilient medium mounted within the substantially continuous chamber formed by said centering means and said interior shell.

In testimony whereof, I have signed my name to this specification this 28th day of October, 1919.

GEORGE A. WEBER.